(No Model.) 5 Sheets—Sheet 3.
H. B. BLANCHE.
STREET CLEANING MACHINE.
No. 506,809. Patented Oct. 17, 1893.
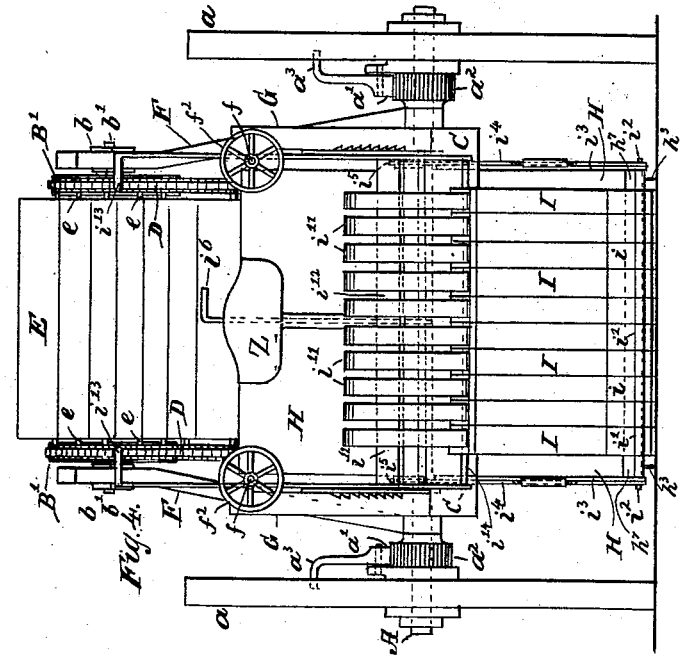
WITNESSES:
Edward Wolff
William Miller
INVENTOR:
Henry Barkly Blanche.
BY
Van Santvoord & Hauff
ATTORNEYS.

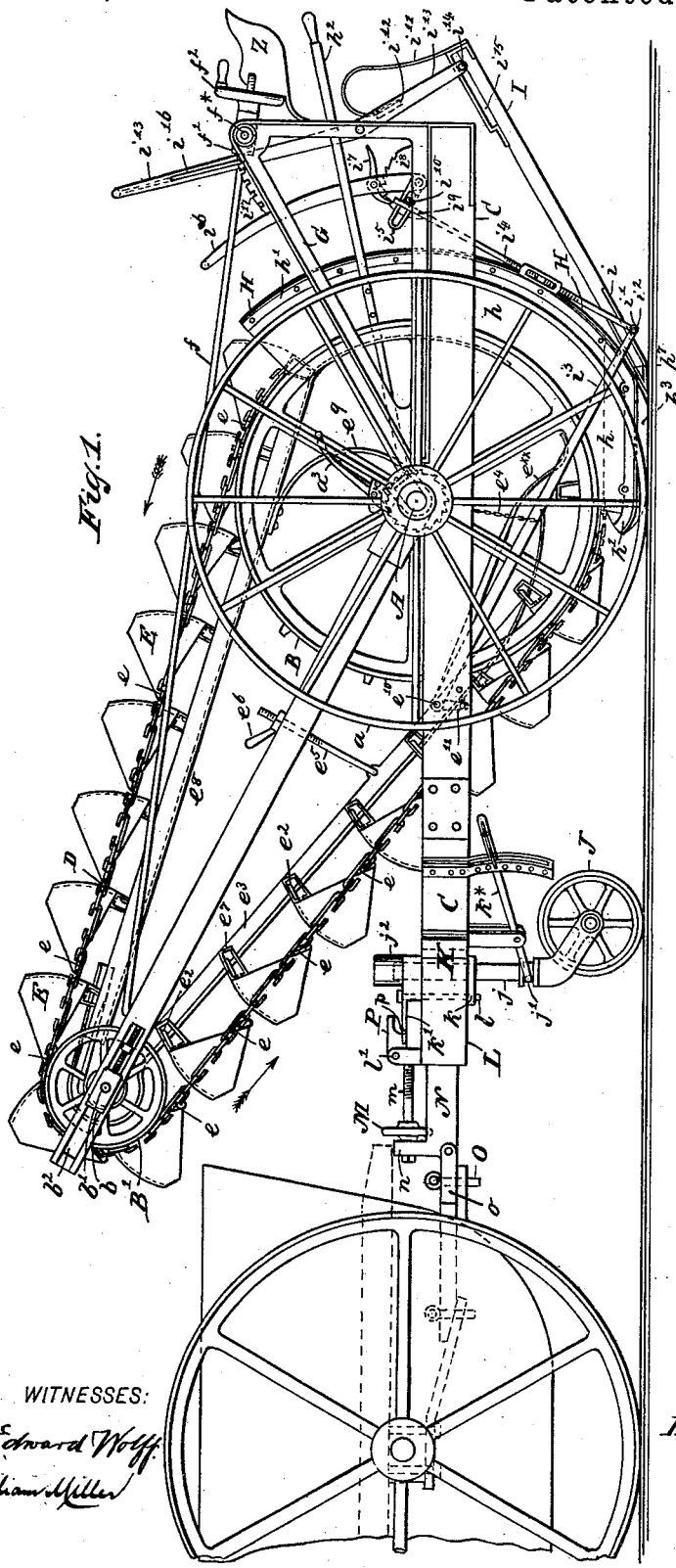

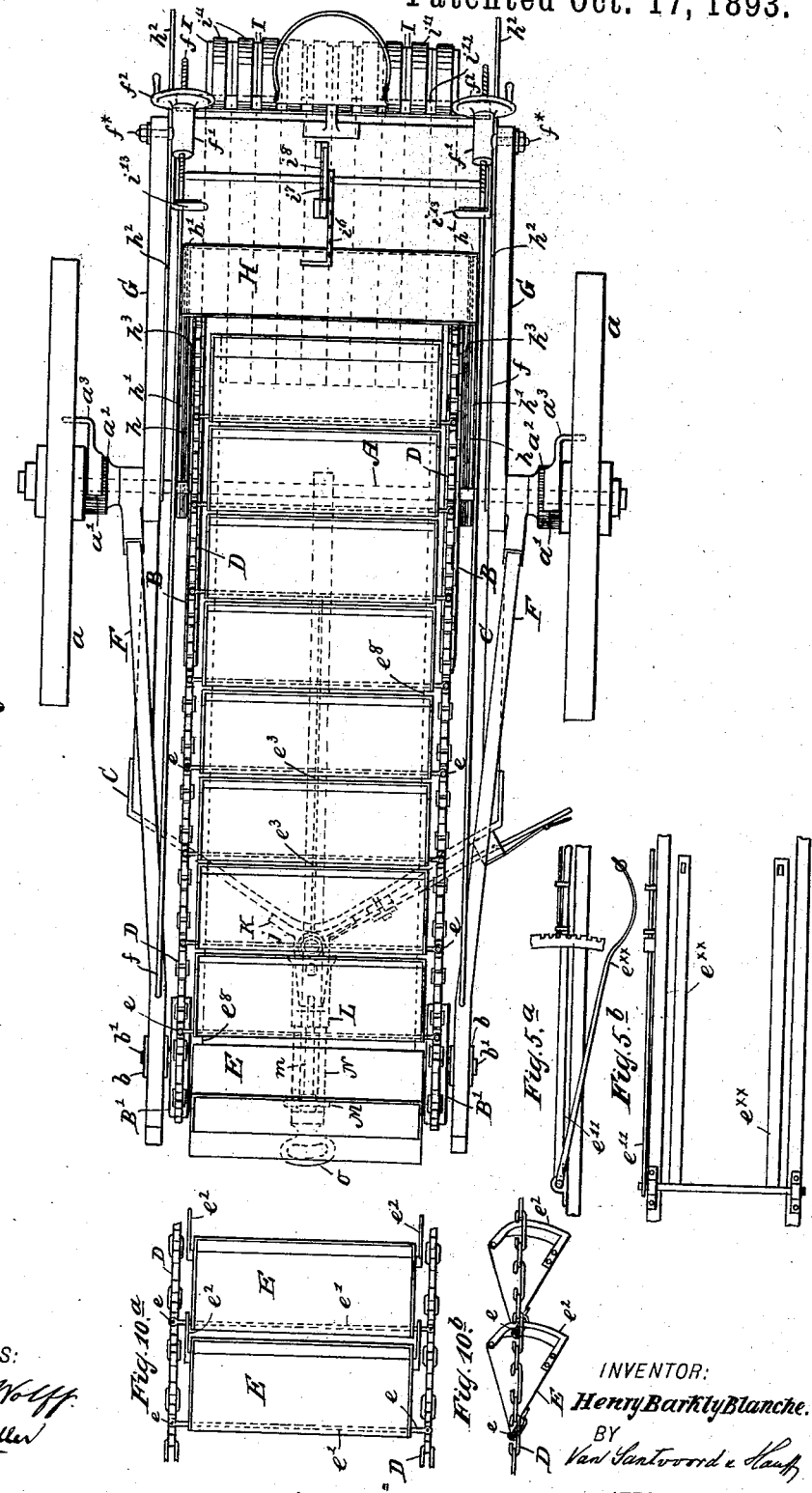

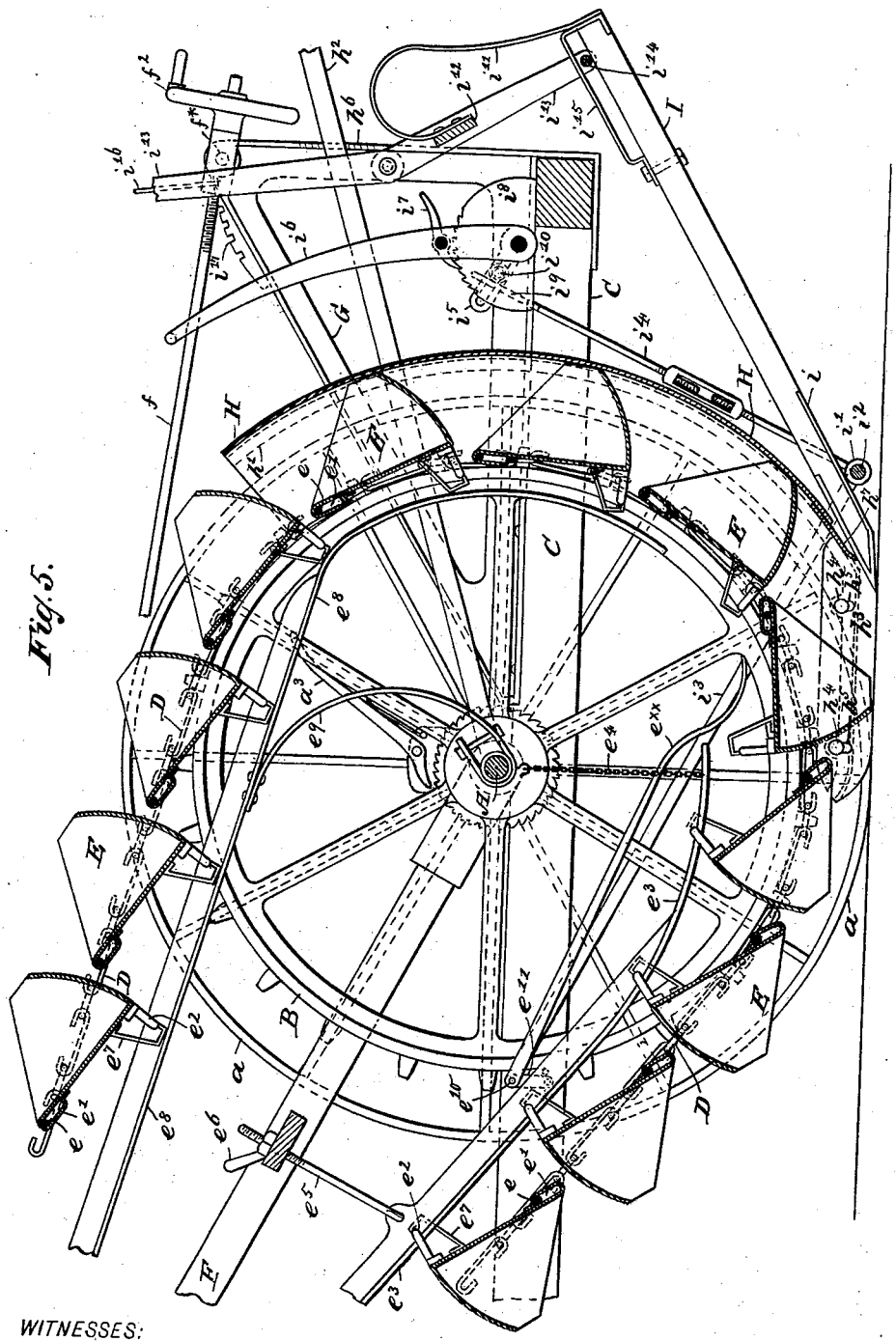

(No Model.) 5 Sheets—Sheet 5.
H. B. BLANCHE.
STREET CLEANING MACHINE.
No. 506,809. Patented Oct. 17, 1893.
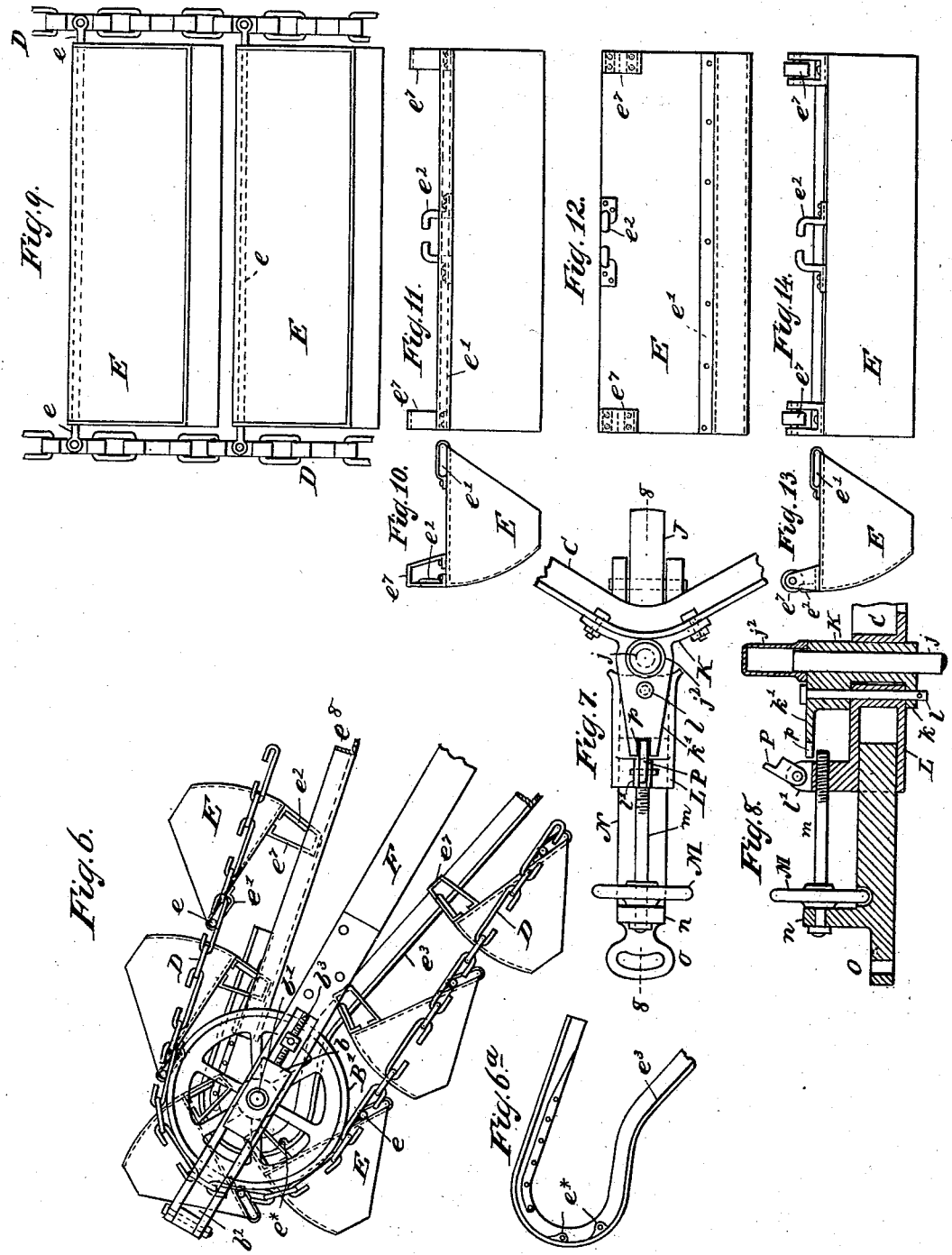
WITNESSES:
Edward Wolff
William Miller
INVENTOR:
Henry Barkly Blanche.
BY
Van Santvoord & Hauff
ATTORNEYS.

UNITED STATES PATENT OFFICE.

HENRY BARKLY BLANCHE, OF MALVERN, ASSIGNOR TO RICHARD LAWRENCE MALCOLM, OF MELBOURNE, VICTORIA.

STREET-CLEANING MACHINE.

SPECIFICATION forming part of Letters Patent No. 506,809, dated October 17, 1893.

Application filed March 2, 1893. Serial No. 464,405. (No model.) Patented in Victoria August 26, 1889, No. 7,033.

*To all whom it may concern:*

Be it known that I, HENRY BARKLY BLANCHE, a subject of the Queen of Great Britain, residing at Malvern, Victoria, have invented new and useful Improvements in Street-Cleaning Machines, (for which I have obtained Letters Patent in Victoria, dated August 26, 1889, No. 7,033,) of which the following is a specification.

Various machines have been devised which were intended to be secured behind a traveling dray, truck, lorry, or other conveyance, and which served to raise the material previously swept to the side of the road into such conveyances. The machines however, which have hitherto been employed are not only cumbersome but they worked with so much friction as to require a considerable amount of power to operate them, thereby, of course, materially increasing the cost of removing refuse and other material from the thoroughfares.

Now the object of my invention is to provide a comparatively simple and inexpensive machine of this description which will necessitate the employment of considerably less power to operate it while at the same time it will do its work in a more efficient and satisfactory manner than any that have heretofore been devised.

One of the essential features in my improved apparatus is the employment of a series of elevating buckets supported upon endless chains and arranged to travel around the upper end of a pair of jibs, as well as around a pair of comparatively large sprocket wheels mounted upon the main axle of the apparatus. Instead, however, of these elevating buckets being, as is usual in this class of apparatus, caused to travel in a contrary direction to the machine I cause them to travel in the same direction.

At the rear end of my improved apparatus I arrange a segmental plate or concave whose lower end extends down to near the surface of the ground while its upper end extends around the sprocket wheels just mentioned to near the highest point thereof. Beneath this concave I arrange a series of inclined scraper bars, whose lower ends are wedge-shaped and are adapted to project beneath the lowermost edge of said concave. They are supported and pressed forward by suitable means, as will hereinafter be described. In order that my machine may be readily coupled to the back of a dray, trolley or other conveyance I provide a coupling device which admits of a lateral as well as an endwise movement and I support the forward end of the machine upon a caster wheel, which I so construct and arrange as that it can be readily raised or lowered at will, so as to adjust the height of the forward end of the machine to suit the height of the conveyance to which it is desired to attach it and at the same time to enable it to be raised bodily off the ground when required.

Having now generally described and ascertained the nature of my said invention and in what manner the same is to be performed I will proceed to describe the same more particularly with the aid of the accompanying drawings, wherein—

Figure 1 is a side elevation. Fig. 2 is a plan. Fig. 3 is a front elevation, and Fig. 4 a rear elevation of my improved machine for elevating street refuse or other material into drays or other conveyances. Fig. 5 is a vertical longitudinal section of the lower part of my improved machine. Figs. 5$^a$ and 5$^b$ are respectively a detail side view and a plan view hereinafter explained. Fig. 6 is a side view of the upper part thereof. Fig. 6$^a$ is a detached view of the upper part of a guide bar hereinafter described. Fig. 7 is a plan of part of the machine illustrating the mechanism employed for connecting it to a dray or other conveyance. Fig. 8 is a vertical section on the line 8 8 Fig. 7. Fig. 9 is a plan of part of the endless chains and two of the elevating buckets of my improved machine, illustrating the construction of the former and the manner of connecting the latter to them. Figs. 10, 11, and 12 are respectively a side elevation, front elevation, and plan of one of said elevating buckets. Figs. 10$^a$ and 10$^b$ are views illustrating a modified arrangement for supporting the buckets. Figs. 13 and 14 are similar views to Figs. 10 and 11 respectively, but illustrating a slight modification, which will be hereinafter described. Figs. 15 and 16 are respectively a side elevation looking from the inside of the machine and a front elevation of the pawl and ratchet gearing employed for throwing the "bull" or drive wheel of my machine into and out of gear with the elevating buckets. Fig. 17 is a similar view to Fig. 16, but illustrating the employment of a sliding clutch in lieu of the pawl and ratchet shown in Fig. 16. Figs. 18 to 21 are views illustrating various modifications of my invention. Figs. 1 to 4 and 15, 16 and 17, are drawn to a scale of about three-quarters of an inch to the foot, while the remaining figures are drawn to a scale of about an inch and a quarter to the foot.

$a$ $a$ represent the main bull wheels of the machine which are loosely mounted upon an axle A extending across from side to side of the framing of the machine but which are capable of being thrown into gear with said axle by means of pawl $a'$, (Figs. 1 to 4, 15 and 16,) whose inner ends are adapted to engage with the teeth of ratchet wheels $a^2$ which are fast upon said axle, said pawls being supported by a pin projecting inwardly from the hubs of said wheels while the outer ends $a^3$ of said pawls are so arranged as that they contact with one or other of the spokes of said wheels, thus enabling said pawls to be thrown into or held out of gear with the teeth of said ratchet wheels by placing the said outer ends $a^3$ of said pawls either in front of or else behind said spokes as will be well understood.

If preferred, instead of employing the pawls $a'$ for connecting the bull wheels of the machine to the main driving axle thereof, I sometimes mount sliding clutches $a^*$ upon the latter as shown in Fig. 17 and arrange said clutches so that they can be put into or out of gear with correspondingly toothed clutches $a^{2*}$ secured to said bull wheels. The teeth which as above mentioned are formed upon said clutches are preferably ratchet teeth in order to allow the machine to travel backward without operating the elevating contrivances. Sprocket wheels B, Figs. 1 and 5, are also secured upon the axle A of the machine within the main framing C. A pair of endless chains D upon which are mounted a number of elevating buckets E are arranged to travel around these sprocket wheels B, B, and around smaller sprocket wheels B', Figs. 1 and 6 mounted in bearings upon the upper end of a pair of jibs F. The bearings $b$ in which the axle $b'$ of the small pair of sprocket wheels B' is mounted are arranged to slide to and fro in the slots $b^2$ cut in the upper ends of the jibs F F, and set screws $b^3$ are provided which serve to adjust said sliding bearings in any desired position so as to tighten the endless chains D to any extent required.

The jibs F are held at a suitable elevation by means of a pair of stays $f$ whose rear ends are screw threaded as shown in Figs. 1, 2, and 5, and pass through the guides $f'$ supported by triangular shaped frames G at the rear end of the main framing C and fit into correspondingly screw threaded bosses upon a pair of hand-wheels $f^2$, whereby said stay-bars may be tightened up or slackened out so as to raise or lower the jibs F in order to suit the height of the lorry or other vehicle into which it is required to "dump" the material raised from the road. The guides $f'$ are free to turn about their centers $f^*$ to suit the varying angles of the tie rods $f$.

The forward ends of each of the buckets E are connected to the endless chains D by rods or bars $e$ (Fig. 9) extending between and secured to them by bolts passing through eyes in the ends of said rods, the latter passing through slots $e'$ formed upon said forward ends of said buckets. The rear ends of these latter are provided each with a clip $e^2$, which is shaped as illustrated in Figs. 11 and 12 and is adapted to engage with the horizontal flanges of a piece of T iron $e^3$ which latter extends from a point near the top of the jib around the small sprocket-wheels B' and down to a point immediately beneath the axle A of the machine at which point it is adjustably supported by a chain $e^4$, (Fig. 5) which can be let out or taken up at will for that purpose. At the upper end of the guide bar $e^3$ I attach projections $e^*$ $e^*$ on either side thereof as shown in Fig. 6ª in order to give a shaking movement to the buckets when they are discharging their contents. I prefer to make the lower part of the T iron guide $e^3$ of a piece of flat spring for the purpose hereinafter described. About midway of its length I support said guide $e^3$ by a rod $e^5$ whose upper end is screw threaded as shown in Fig. 1 and is provided with a small hand wheel or screw threaded lever $e^6$ whereby said guide may be raised or lowered according to requirements. The upper end of this said guide $e^3$ is carried around the axle $b'$ of the said sprocket wheels B' as illustrated in Figs. 1 and 6, that is, in such a manner as that the buckets will be allowed to fall forward to their farthest extent and then have their rear ends drawn upward so as to clear the edge of the cart into which they are designed to discharge their contents. The rear ends of the buckets E are supported while traveling upward either by the lugs $e^7$ or else by the anti-friction rollers shown in Figs 13, 14, both of which are adapted to rest upon flat guide bars $e^8$, which extend partly around the main axle A of the machine alongside the sprocket wheels B up to the axle $b'$ of the small pair of sprocket wheels B'. By this means the rear ends of the buckets are supported until the clips $e^2$ upon them engage with the T iron guide bar $e^3$ which then, of course, serves to support them, as above mentioned. The guide bars $e^8$ are preferably supported upon the axle of the machine by curved upwardly projecting bars $e^9$ secured to said axle as shown in Figs. 1 and 5. A spring bar or lever $e^{\times\times}$ is suspended above the lower end of the bucket supporting bar $e^3$ as illustrated in Figs. 1 and 5, said spring bar being so arranged as to press upon said buckets as they are about to leave the end of said supporting bar, thus accelerating their fall and causing them to cut through the material which it is desired to remove. If required this spring may be made adjustable either by being pivoted at its end as shown at $e^{10}$ and being provided with a short arm $e^{11}$ which can be retained in any desired position by pins inserted in holes in the frame work of the machine, or else by being provided with a lever which can be adjusted into and retained in any desired position by means of a spring-catch and quadrant as clearly illustrated in Figs. $5^a$ and $5^b$.

A curved plate or concave H is arranged behind the buckets E and passes around the sprocket wheels B, said curved plate being provided with sides $h$, which project on either side of said buckets, said sides being preferably secured to said curved plate or concave by pieces of angle-iron $h'$. The said side plates $h$ of said concave are moreover, bolted, riveted, or otherwise rigidly secured to a pair of levers $h^2$, whose inner ends are pivoted upon the main axle A of the machine and whose outer ends project into a convenient position to enable the man in charge of the machine to raise and lower said concave when desired. The bars of angle-iron $h'$ extend forwardly at the lower end of the concave a few inches above the ground, and serve to support the projecting portion of the lower ends of the sides $h$ of said concave. On the inner side of each of these latter is arranged a plate $h^3$, which is secured thereto by bolts $h^4$ passing through slots $h^5$ in said plates in such a manner as that the latter are free to ride up and down according to the inequalities of the ground over which the machine is traveling.

Teeth $h^6$ are cut in the edges of the vertical portions of the frame G in order that the levers $h^2$ may be caused to engage therewith, and so to be held in any desired position in order to regulate the height of the concave H above the ground. The lower end of the concave H is formed with a flat spring plate $h^7$, Figs. 1 and 5, which extends from side to side of said concave, and bears upon the upper surface of a series of scrapers I. These latter consist of a number of bars of wood or other suitable material of about three inches in width shod at their lower ends with iron or steel, as illustrated at $i$. These said lower ends are supported immediately under the lower end of the concave H by a number of rollers $i'$ upon a bar $i^2$ extending across the machine between a pair of levers $i^3$ which are pivoted at their upper ends to the main frame C of the machine and which are connected at their lower ends by rods $i^4$ with the slotted arm $i^5$ of a lever $i^6$ whereby said rollers $i'$ may be raised and lowered at will. A retaining pawl $i^7$ is mounted upon this lever $i^6$ and is arranged to engage with the ratchet teeth of a quadrant $i^8$ secured to some convenient part of the framing C. A stirrup $i^9$ upon the upper end of the rod $i^4$ fits over said arm $i^5$ and is secured at any desired distance from the fulcrum of the lever $i^6$ by a small bolt $i^{10}$ which is passed through said slot behind said stirrup.

The scrapers I are pressed down upon the surface of the ground each by a flat spring $i^{11}$ secured to a bar $i^{12}$ extending between a pair of adjusting levers $i^{13}$, whose lower ends support the upper ends of said scrapers through the medium of a bar or rod $i^{14}$ passing through guides or slots $i^{15}$ on said upper ends. These levers $i^{13}$ can be adjusted into any desired position so as to vary the amount of pressure of the springs $i^{11}$ upon the ends of the scrapers I and can be retained in such position by means of a spring-catch $i^{16}$ fitting into notches in the end of a rack or plate $i^{17}$.

A seat Z may be provided at the rear of the machine, if required, such seat being so arranged as to allow the driver to conveniently operate the various levers on the machine.

In order that my invention may be conveniently attached to the rear end of a cart, lorry, trolley, or other conveyance, I support its front end upon a caster-wheel J, whose spindle $j$ passes through suitable bearings in front of the machine and is provided with a channel or groove $j'$ with which can engage the inwardly projecting pins on the forward end of a lever $k^*$ which is arranged to work up and down between guides and to be retained in any desired position by a pin passed through the holes therein as will be well understood. A cap $j^2$ is arranged above the spindle $j$ of the caster wheel J in order to keep out the dirt from the bearings through which, as above mentioned, said spindle passes. The casting K forming this bearing is bolted, riveted or otherwise secured to a piece of angle-iron extending across the front of the machine, as shown in Figs. 2 and 7 and it is provided with a pair of forwardly projecting lugs $k$ $k'$ between which fits a socket piece L, which is secured between said lugs by a bolt $l$, passing through holes therein as shown. This socket piece L is free to turn through an angle of about twenty degrees sidewise, and its forward end is provided with a small upwardly projecting lug $l'$ which is screw threaded to receive a correspondingly screw threaded rod $m$, whose forward end passes loosely through an upwardly projecting lug $n$ on the forward end of a rod or bar N which fits into the hollow end of the socket piece L. A small hand-wheel M is secured to said rod $m$ on the inside of the lug $n$ in order that the said rod may be rotated so as to shorten or lengthen the rod N whose forward end is provided with an eye $o$ through which a pin O may be passed so as to connect it to a suitably constructed part of the cart or other conveyance, into which it is desired to elevate the material. A small finger P is pivoted to the lug $l'$ and is so arranged as that when the bar N and socket L are in line with the main framing C of the machine it can be placed in engagement with a suitably formed slot $p$ in the upper lug $k'$ of the casting K, thus retaining the eye $o$, bar N, and socket piece L in their central positions.

When it is required to connect my invention to an ordinary cart it is necessary to employ a connecting bar which can be attached at one end to the axle of said cart while its other end is formed with an eye through which the pin O, Fig. 1, can be passed as above described.

If preferred I can arrange the buckets E as illustrated in Figs. $10^a$ and $10^b$, that is I can support them at their forward ends by means of the slots $e'$ and bars $e$ and secure a pair of curved bars $e^2$ to their rear ends in such a manner as that each of the said bars will pass around the bar $e$ supporting the bucket next below as clearly illustrated in said figures.

The operation of my invention is as follows: Assuming it to be attached to the back of a lorry or other conveyance, and to be drawn along the surface of the road, from which it is desired to remove a row of material which has been swept to the side thereof, say for instance, by a road-sweeping or scraping machine, then, as will be obvious, the scraping bars I traveling along the surface of the ground will cause the material to collect at the lower end of the concave H. As the machine travels the buckets E will be caused to travel in the direction illustrated by the arrows in Fig. 1. As they travel forwardly their rear ends will be supported by the lugs $e^7$ resting upon the guide plates $e^8$ until they near the small sprocket wheels B' on the upper ends of the jibs F. At this point the clips $e^2$ will engage with the horizontal flanges of the T-iron guide-bar $e^3$. Up to about this point said buckets will tend to draw back until the cross-bars $e$ are in the extreme upward end of the slots $e'$. As they pass around the small sprocket wheels B' they will overbalance and will fall suddenly forward as far as the slots $e'$ will allow them, the effect being to give a jerk to said buckets and to cause them to deliver their contents into the cart or other receiving conveyance below, as will be well understood. As they continue to travel their rear ends will be drawn up out of the way of said cart by reason of the upward curve given to the bar $e^3$ at its upper end. They will continue to travel down said guide bar until they have passed a perpendicular line let down from the main axle of the machine. At this point the clips $e^2$ will become disengaged from said guide-bar and will thereby allow the rear end of said buckets to fall suddenly on to the mud or other material which is on the ground below. This material will then be raised by said buckets inside the concave H and will be carried up to and discharged into the receptacle as above described.

Referring now to Figs. 18 to 21 which, as above mentioned represent several modifications of my invention,— Fig. 18 represents the employment of a series of scrapers I which are supported by two or more parallel links $i$, whose other ends are pivoted to some fixed part of the machine a spring $i^{11}$ being employed to hold such bars down as will be well understood. $i^{12}$ represents the lever which is connected to one or other of said links $i$, and whose lower end carries said spring $i^{11}$ whereby I provide for raising said scrapers from off the ground or vary the pressure of their lower ends thereon.

In Fig. 19 a similar arrangement to that illustrated in Fig. 18 is shown, the essential difference between the two arrangements being that the scrapers I are connected by links $i$ to a second fixed bar $I^*$ arranged beneath and parallel to said scrapers. A lever $i^{12}$ is employed in this case as in the others to raise and lower and to adjust the pressure of said scrapers I.

Fig. 20 illustrates the scrapers I pivoted at their upper ends to the axle of the machine or else to a bar extending across said machine either above or below said axle, in such a manner as that they will be free to rise or fall, so as to pass over any inequalities in the road. In this case said scrapers may be adjusted to and from the ground or may be raised by means of the lever $i^{12}$ whose short arm is so arranged as that it projects beneath a projection $i^{15}$ on the back of said scrapers.

In Fig. 21 I have illustrated the employment of scrapers whose lower ends (I) are made comparatively stiff, and are arranged to lie flat upon the surface of the ground and therefore at an angle to the remainder $I'$ of said scrapers. These parts $I'$ are made of steel spring or other material in such a manner as that in the event of the forward part of the scraper coming into contact with a rigid obstruction it will be bent into a curved form, as illustrated in dotted lines in said Fig. 21, and will therefore raise said forward part of the scraper and cause it to jump over the obstruction afterward returning to its normal position, as will be well understood. In order to prevent the spring I from bending upward I arrange a thin bar $I^2$ above it as shown in said figure. It will be obvious from the description above given that the side plates $h^3$ at the lower ends of the sides of the concave H will be free to ride up and down to suit the inequalities of the ground and it will also be obvious that the scrapers I will likewise be free to move backward and therefore upward in the event of their meeting any obstruction such for instance as a water-cock or stump in the roadway.

My improved machine can also be easily attached to the rear end of a cart without the necessity for simply drawing the whole of the machine into position to suit such cart, it being merely necessary to raise the finger P out of engagement with the slot $p$ in the casting K, thus enabling the bar N and socket L to move sidewise into the desired position when, if the eye $o$ is not high enough to correspond with the corresponding eye which is connected to the rear end of the conveyance the forward end of my machine may be raised by means of the lever $k^*$, and if required, said eye $o$ and rod N may be extended by means of the small hand-wheel M and screw threaded rod $m$. Thus as will be seen, I am enabled to readily attach my improved machine to various descriptions of conveyances even when such conveyances are not placed in an otherwise convenient position for effecting the purpose. It will likewise from the foregoing description be obvious that the scrapers I may be kept pressed down upon the surface of the ground with any desired pressure through the medium of springs $i^{11}$, while the lower ends of said scrapers may be pressed against the lower ends of the concave H by operating the lever $i^6$. At the same time the concave H may be raised or lowered by means of the levers $h^2$, and, if desired, the whole machine may readily be thrown out of gear by operating the pawls $a'$ or sliding clutch $a^*$. Under some circumstances as, for instance, when it is required to remove loose sand or earth from the surface of the ground, I may dispense with the scrapers I by lowering the curved plate or concave H on the ground and causing it to scoop up such loose sand or other material. The lower end of said concave and the lower working edges of the buckets may be provided with projecting ribs or teeth when it is required to remove clods of earth or other similar material requiring to be pulverized.

What I claim as new, and desire to secure by Letters Patent, is—

1. In a street cleaning machine such as is herein described, the combination with a series of elevating buckets (such as E) supported upon a pair of traveling chains (such as D), of a curved plate or concave (such as H) supported at the rear of the machine, together with a series of scrapers (such as I) arranged to project beneath the lower edge of said curved plate or concave, substantially as and for the purposes herein described and explained and as illustrated in Figs. 1, 2, 3 and 5 of my drawings.

2. In a street cleaning machine such as is herein described, the combination with a curved plate or concave (such as H) secured thereto and supported by a pair of levers (such as $h^2$) pivoted at their inner ends upon the main axle (such as A) of the machine, of a series of inclined scrapers (such as I) adapted to project beneath the lower edge of said curved plate or concave, together with springs (such as $i^{11}$) for keeping said scrapers in their forward positions, as well as a bar (such as $i^2$) preferably provided with anti-friction rollers (such as $i'$) and arranged to extend beneath said scrapers near their lower ends, and connected by a rod (such as $i^4$) with the short arm of a lever (such as $i^6$) whereby said lower ends of said scrapers may be adjusted as required, substantially as and for the purposes herein described and explained and as illustrated in Figs. 1 and 5.

3. In a street cleaning machine such as herein described, the combination with a bull or drive wheel (such as $a$), of a series of buckets (such as E) each of said buckets being provided with a clip (such as $e^2$) at its rear end adapted to engage with a guide-bar (such as $e^3$) in order to support the rear ends of said buckets while they are traveling downward as well as with projecting lugs or rollers (such as $e^7$) adapted to work upon the upper surface of a guide bar (such as $e^8$) in order to support the rear ends of said buckets when traveling upward, as well as with lugs (such as $e'$) so constructed as to allow said buckets to fall forward a certain distance, substantially as and for the purposes herein described and explained and as illustrated in Figs. 1, 5, 6, and 9 to 14 of my drawings.

4. In a street cleaning machine such as is herein described, the combination with a series of elevating buckets (such as E) supported upon endless chains (such as D) by rods (such as $e$) passing through slots (such as $e'$) in the forward ends of said buckets, of a guide bar (such as $e^3$) so arranged as that clips (such as $e^2$) on the rear ends of said buckets can engage therewith, substantially as and for the purposes herein described and explained and as illustrated in my drawings.

5. In a street cleaning machine such as is herein described the combination with a series of elevating buckets (such as E) of a guide (such as $e^3$) adapted to support the rear ends of said buckets while traveling downward until they come into position in front of a scraper or scrapers (such as I) when it will allow the rear ends of said buckets to fall suddenly, so as to cut through the material to be elevated, substantially as and for the purposes herein described and explained and as illustrated in Figs. 1 and 5 of my drawings.

6. In a street cleaning machine such as is herein described, the combination with a socket piece (such as L) pivotally connected with a casting (such as K) through which passes the spindle of a caster-wheel and in relation to which said socket may be retained in a fixed position by a pivoted finger (such as P), of a bar (such as N) adapted to fit in said socket, and to be adjusted therein by means of a screw threaded rod (such as $m$) substantially as and for the purposes herein described and explained and as illustrated in Figs. 1, 2, 3, 7, and 8.

7. In a street cleaning machine such as is herein described, the combination with a series of buckets supported at their forward ends upon a pair of endless chains by rods (such as $e$) passing through slots in the forward ends of said buckets, of a guide bar (such as $e^8$) provided with projections (such as $e^*$) adapted to give a "kick" or shaking movement to said buckets, substantially as and for the purposes herein described and explained and as illustrated in my drawings.

8. In a street cleaning machine such as is herein described, the combination with a pair of jibs (such as F) extending upwardly at an angle from the axle of the machine, of a pair of screw threaded stays (such as $f$) secured to the upper ends of said jibs, and passed through the screw threaded bosses of a pair of hand-wheels (such as $f^2$), substantially as and for the purposes herein described and explained and as illustrated in my drawings.

9. In a street cleaning machine such as is herein described, the combination with a guide bar (such as $e^3$) adapted to support the rear ends of a series of buckets (such as E), of a spring (such as $e^{xx}$) suspended above the lower end of said guide-bar and arranged to press said buckets downward, substantially as and for the purposes specified and as illustrated in Figs. 1, 5, 5$^a$, and 5$^b$ of my drawings.

10. In a street cleaning machine such as is herein described, the combination with a series of traveling buckets (such as E) adapted to elevate material into a conveyance, of a series of scrapers (such as I) suspended by two or more parallel links (such as $i$) from a fixed support on said machine, substantially as and for the purposes described and explained and as illustrated in Fig. 18 of my drawings.

11. In a street cleaning machine such as is herein described, the combination with a curved plate or concave (such as H) of a series of scrapers (such as I I') having their lower ends rigid and adapted to rest flat upon the surface of the ground while their upper parts (I') are made of spring steel or other material in such a manner as that they will bend upon their forward ends contacting with an obstruction and will thereby raise said forward ends over said obstruction, substantially as and for the purposes herein described and explained and as illustrated in Fig. 21 of my drawings.

In testimony whereof I have hereunto set my hand in the presence of two subscribing witnesses.

HENRY BARKLY BLANCHE.

Witnesses:
GEO. H. WALLACE,
C. HARKETT.